(12) United States Patent
Collina et al.

(10) Patent No.: US 9,453,088 B2
(45) Date of Patent: Sep. 27, 2016

(54) CATALYST COMPONENTS FOR THE POLYMERIZATION OF OLEFINS

(75) Inventors: Gianni Collina, Ferrara (IT); Ofelia Fusco, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 1196 days.

(21) Appl. No.: 12/735,278

(22) PCT Filed: Dec. 22, 2008

(86) PCT No.: PCT/EP2008/068132
§ 371 (c)(1),
(2), (4) Date: Jun. 28, 2010

(87) PCT Pub. No.: WO2009/083522
PCT Pub. Date: Jul. 9, 2009

(65) Prior Publication Data
US 2010/0292419 A1  Nov. 18, 2010

Related U.S. Application Data

(60) Provisional application No. 61/010,535, filed on Jan. 9, 2008.

(30) Foreign Application Priority Data

Dec. 28, 2007  (EP) .................... 07150461

(51) Int. Cl.
| | | |
|---|---|---|
| C08F 4/20 | (2006.01) | |
| C08F 110/06 | (2006.01) | |
| B01J 27/135 | (2006.01) | |
| B01J 27/138 | (2006.01) | |
| B01J 31/02 | (2006.01) | |
| B01J 31/14 | (2006.01) | |
| B01J 31/26 | (2006.01) | |
| B01J 31/38 | (2006.01) | |

(52) U.S. Cl.
CPC ............ C08F 110/06 (2013.01); *B01J 27/135* (2013.01); *B01J 27/138* (2013.01); *B01J 31/0201* (2013.01); *B01J 31/0272* (2013.01); *B01J 31/143* (2013.01); *B01J 31/26* (2013.01); *B01J 31/38* (2013.01)

(58) Field of Classification Search
CPC ........................................... C08F 4/50
USPC ....................................... 526/124.3
See application file for complete search history.

(56) References Cited

U.S. PATENT DOCUMENTS

| 4,298,718 A | 11/1981 | Mayr et al. |
|---|---|---|
| 4,495,338 A | 1/1985 | Mayr et al. |

FOREIGN PATENT DOCUMENTS

| EP | 0517183 | * | 6/1992 |
|---|---|---|---|
| EP | 0517183 A2 | | 12/1992 |
| EP | 0488856 B1 | | 9/1995 |
| EP | 0713888 A2 | | 5/1996 |
| EP | 0541760 B1 | | 8/1996 |
| JP | H06100623 A | | 4/1994 |
| JP | H09104709 A | | 4/1997 |
| JP | 2001233878 A | | 8/2001 |
| JP | 2002522571 A | | 7/2002 |
| JP | 2005146197 A | | 6/2005 |
| JP | 2005187550 A | | 7/2005 |
| WO | WO 99/57160 | * | 4/1999 |
| WO | WO 99/57160 | * | 11/1999 |
| WO | WO 00/08065 | | 2/2000 |
| WO | WO 02/051544 A1 | | 7/2002 |
| WO | WO 2005/039745 A1 | | 5/2005 |

* cited by examiner

*Primary Examiner* — Yong Chu
*Assistant Examiner* — Sonya Wright

(57) ABSTRACT

Prepolymerized catalyst component for the polymerization of olefins $CH_2=CHR$ in which R is hydrogen or a hydrocarbyl radical with 1-12 carbon atoms, having average particle size equal to or lower than 30 μm comprising a solid catalyst component comprising magnesium halide, a titanium compound having at least a Ti-halogen bond and at least two electron donor compounds one of which being selected from 1,3-diethers and the other one being selected from esters of aromatic mono or dicarboxylic acids, said solid catalyst component being prepolymerized with an olefin, having from 2 to 10 carbon atoms, to such an extent that the amount of the olefin prepolymer is equal to or lower than 50 g per g of solid catalyst component.

13 Claims, No Drawings

CATALYST COMPONENTS FOR THE POLYMERIZATION OF OLEFINS

This application is the U.S. national phase of International Application PCT/EP2008/068132, filed Dec. 22, 2008, claiming priority to European Patent Application 07150461.7 filed Dec. 28, 2007, and the benefit under 35 U.S.C. 119(e) of U.S. Provisional Application No. 61/010,535, filed Jan. 9, 2008; the disclosures of International Application PCT/EP2008/068132, European Patent Application 07150461.7 and U.S. Provisional Application No. 61/010,535, each as filed, are incorporated herein by reference.

The present invention relates to prepolymerized catalyst for the polymerization of olefins, in particular propylene, having a specific average components particle size and comprising a Mg dihalide based support on which are deposited a Ti compound having at least one Ti-halogen bond and at least two electron donor compounds selected from specific classes. The present invention further relates to a gas-phase process for the polymerization of olefins carried out in the presence of a catalyst system comprising said catalyst component.

The behaviour of a gas phase reactor is well known in the art. When correctly operated this kind of polymerization technique is able to give, with a relatively low investment cost, polymers endowed with good properties. In gas-phase reactors the reactor throughput is proportional to the amount of polymerisation heat that can be removed from the fluidised bed. Heat is exchanged by means of the recirculation gas and in some processes a partial condensation occurs and the resulting liquid is injected into the polymer bed. In this case it can be said that the process is operating in condensing mode.

Reactor throughput is generally pushed to its maximum by increasing gas mass flow rate up to the value allowed by limit fluidization gas velocity. Exceeding this limit, a significant portion of polymer particles is entrained by recirculation gas: as a consequence, gas recirculation pipe and fan sheeting occurs, heat exchangers tubes and distribution grid become plugged. In turn, the maintenance cost becomes higher, the manufacturing time longer and production losses are also involved.

The entrainment velocity is a direct function of particle size and density. Bigger and/or denser particles allow higher fluidization gas velocity and therefore, in order to optimize the gas velocity, polymer density should be kept up to the maximum value allowed by final application grade, while small polymeric fraction is to be avoided.

One of the sources of small polymeric fractions, so called fines, is due to the high reactivity during the initial stages of polymerization which causes the catalyst becoming irregularly fragmented. According to general knowledge, another source of small particles can be represented by the use of catalyst precursors having a small average particle diameter, such as lower than 30 µm particularly, as explained in EP-B-713888, in combination with a broad particle size distribution.

It is known to the skilled in the art and described in many publications such as EP-B-541760, that in order to solve these problems, it is advised to use catalyst precursors having average particle size higher than 30 µm that need to be prepolymerized under controlled conditions so as to obtain prepolymerized catalysts having controlled morphology. After prepolymerization, the catalyst particles become bigger and also increase their resistance in such a way that the tendency to break under polymerization conditions is decreased. As a consequence, the catalyst is able to produce bigger polymer particles and also the formation of fines is reduced. However, by effect of prepolymerization, the catalyst activity often becomes reduced and this partially thwarts the efforts to obtain higher productivity with the use of larger prepolymerized catalyst particles.

It has been surprisingly found that a prepolymerized catalyst having average particle size lower than 30 µm and comprising a catalyst precursor on which an ester of aromatic dicarboxylic acid and a specific 1,3-diether are supported on magnesium chloride, exhibits together with enhanced morphological stability, a very high activity.

Catalyst components comprising a support made of magnesium chloride on which a titanium compound and a specific couple of electron donor compounds selected from esters of dicarboxylic acid and dieters are disclosed in WO99/057160. According to this document, the so obtained catalysts allow to obtain propylene polymers with high values of xylene insolubility combined with broad range of isotacticity. The possibility of using the said catalyst in gas-phase polymerization is only generically mentioned. Nowhere is discussed or mentioned the average size of the catalysts, the prepolymerization step and, most of all, nowhere is discussed or addressed the technical problem associated with the use of said catalysts in gas-phase polymerization.

Accordingly, it is an object of the present invention a prepolymerized catalyst component having average particle size equal to or lower than 30 µm comprising a solid catalyst component which comprises magnesium halide, a titanium compound having at least a Ti-halogen bond and at least two electron donor compounds one of which being selected from 1,3-diethers and the other one being selected from esters of aromatic mono or dicarboxylic acids, said solid catalyst component being prepolymerized with an olefin having from 2 to 10 carbon atoms to such an extent that the amount of the olefin polymer so obtained is equal to or lower than, 50 g per g of solid catalyst component.

Among the 1,3-diethers mentioned above, particularly preferred are the compounds of formula (I)

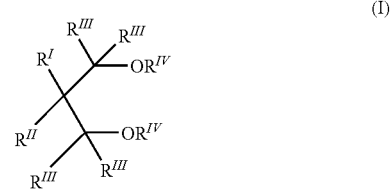

where $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si.

Preferably, $R^{IV}$ is a 1-6 carbon atom alkyl radical and more particularly a methyl while the $R^{III}$ radicals are preferably hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^I$ and $R^{II}$ can also be the same and can be ethyl, propyl, isopropyl, butyl, isobutyl, tert-butyl, neopentyl, phenyl, benzyl, cyclohexyl, cyclopentyl.

Specific examples of ethers that can be advantageously used include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2 (1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dim ethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-di isobutyl-1,3-diethoxypropane, 2,2-diisobutyl-1,3-dibutoxypropane, 2-isobutyl-2-isopropyl-1,3-dimetoxypropane, 2,2-di-sec-butyl-1,3-dimetoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimetoxypropane, 2-cyclohexyl-2-cyclo hexylmethyl-1,3-dimethoxypropane.

Furthermore, particularly preferred are the 1,3-diethers of formula (II)

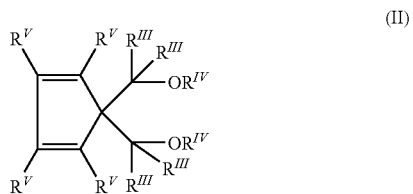

(II)

where the radicals $R^{IV}$ have the same meaning explained above and the radicals $R^{III}$ and $R^V$ radicals, equal or different to each other, are selected from the group consisting of hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals and two or more of the $R^V$ radicals can be bonded to each other to form condensed cyclic structures, saturated or unsaturated, optionally substituted with $R^{VI}$ radicals selected from the group consisting of halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals; said radicals $R^V$ and $R^{VI}$ optionally containing one or more heteroatoms as substitutes for carbon or hydrogen atoms, or both.

Preferably, in the 1,3-diethers of formulae (I) and (II) all the $R^{III}$ radicals are hydrogen, and all the $R^{IV}$ radicals are methyl. Moreover, are particularly preferred the 1,3-diethers of formula (II) in which two or more of the $R^V$ radicals are bonded to each other to form one or more condensed cyclic structures, preferably benzenic, optionally substituted by $R^{VI}$ radicals. Specially preferred are the compounds of formula (III):

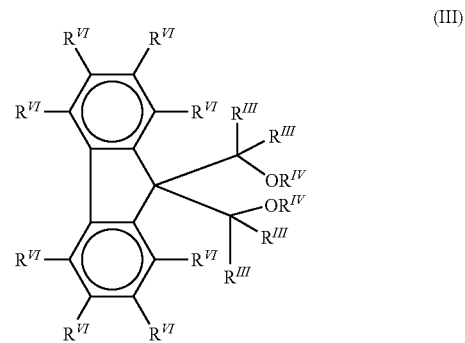

(III)

where the $R^{VI}$ radicals equal or different are hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing one or more heteroatoms selected from the group consisting of N, O, S, P, Si and halogens, in particular Cl and F, as substitutes for carbon or hydrogen atoms, or both; the radicals $R^{III}$ and $R^{IV}$ are as defined above for formula (II).

Specific examples of compounds comprised in formulae (II) and (III) are:
1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene; 1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethylsilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopenthylindene;
1,1-bis(methoxymethyl)-7-isopropylindene;
1,1-bis(methoxymethyl)-7-cyclohexylindene;

1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.

The other electron donor compound which must be present in the solid catalyst component of the invention has to be selected from the esters of aromatic mono or polycarboxylic acids.

Preferred esters of aromatic carboxylic acids are selected from $C_1$-$C_{20}$ alkyl or aryl esters of benzoic and phthalic acids, possibly substituted. The alkyl esters of the said acids being preferred. Particularly preferred are the $C_1$-$C_6$ linear or branched alkyl esters. Specific examples are ethylbenzoate, n-butylbenzoate, p-methoxy ethylbenzoate, p-ethoxy ethylbenzoate, isobutylbenzoate, ethyl p-toluate, diethyl phthalate, di-n-propyl phthalate, di-n-butyl phthalate, di-n-pentyl phthalate, di-1-pentyl phthalate, bis(2-ethylhexyl) phthalate, ethyl-isobutyl phthalate, ethyl-n-butyl phthalate, di-n-hexyl phthalate, di-isobutylphthalate.

As explained above, the solid catalyst components included in the prepolymerized catalyst component of the invention comprise, in addition to the above electron donors, a titanium compound having at least a Ti-halogen bond and a Mg halide. The magnesium halide is preferably $MgCl_2$ in active form which is widely known from the patent literature as a support for Ziegler-Natta catalysts. U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$ can be used, where n is the valence of titanium, y is a number between 1 and n−1 X is halogen and R is a hydrocarbon radical having from 1 to 10 carbon atoms.

The preparation of the solid catalyst component can be carried out according to several methods.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of suitably small particle size having formula $MgCl_2 \cdot pROH$, where p is a number between 0.1 and 6, preferably from 2 to 3.5, and R is a hydrocarbon radical having 1-18 carbon atoms. The adduct can be prepared in suitable spherical form and small particle size by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of small spherical particles. A suitably small average particle size is obtained by providing to the system high energy shear stresses by way of maintaining in the mixer conditions such as to have a Reynolds ($R_{EM}$) number 10,000 and 80,000, preferably between 30,000 and 80,000. The type of flow of a liquid inside a mixer is described by the above mentioned modified Reynolds number ($Re_M$) which is defined by the formula $Re=NL^2 \cdot d/\eta$ in which N is the number of revolutions of the stirrer per unit time, L is the characteristic length of the stirrer while d is the density of the emulsion and $\eta$ is the dynamic viscosity. Due to what described above, it results that one of the methods to reduce the particle size of the adduct is that of increasing the shear stress provided to the system. This can be done in general by increasing the number of revolutions of the stirrer or, as described in WO05/039745 the description of which is included by reference, by using specific devices for preparing emulsion having the particles of the dispersed phase in suitable small size.

According to WO02/051544, the description of which is herein enclosed by reference, particularly good results are obtained when high Reynolds numbers are maintained also during the transfer of the emulsion at the quenching stage and during the quench as well.

When providing sufficient energy to the system, it can be obtained spherical particles of the adduct that already have an average diameter sufficiently small and able to generate a solid catalyst component of suitable size to obtain, upon prepolymerization, a prepolymerized catalyst component with average particle size equal to, or lower than, 30 μm.

The so obtained adduct particles have average particle size determined with the method described in the characterization section below, ranging from 5 to 25 μm preferably from 5 to 20 μm and preferably a particle size distribution (SPAN) lower than 1.2, calculated with the formula $$\frac{P90 - P10}{P50}$$

where, in a particle size distribution curve determined according to the same method, wherein P90 is the value of the diameter such that 90% of the total volume of particles have a diameter lower than that value; P10 is the value of the diameter such that 10% of the total volume of particles have a diameter lower than that value and P50 is the value of the diameter such that 50% of the total volume of particles have a diameter lower than that value.

The particle size distribution can be inherently narrow by following the teaching of WO05/039745 and WO02/051544. However, in alternative to this method or to further narrow the SPAN, largest and/or finest fractions can be eliminated by appropriate means such as mechanical sieving and/or elutriation in a fluid stream.

The adduct particles can be directly reacted with Ti compound or it can be previously subjected to thermal controlled dealcoholation (80-130° C.) so as to obtain an adduct in which the number of moles of alcohol is generally lower than 3 preferably between 0.1 and 2.5. The reaction with the Ti compound can be carried out by suspending the adduct particles (dealcoholated or as such) in cold $TiCl_4$ (generally 0° C.); the mixture is heated up to 80-130° C. and kept at this temperature for 0.5-2 hours. The treatment with TiCl$_4$ can be carried out one or more times. The electron donor compounds can be added during the treatment with TiCl$_4$. They can be added together in the same treatment with TiCl$_4$ or separately in two or more treatments.

The solid catalyst components obtained according to the above method show a surface area (by B.E.T. method) generally between 20 and 500 m$^2$/g and preferably between 50 and 400 m$^2$/g, and a total porosity (by B.E.T. method) higher than 0.2 cm$^3$/g preferably between 0.2 and 0.6 cm$^3$/g.

In the above mentioned preparation methods the esters of aromatic carboxylic acids, can be added as such or, in an alternative way, it can be obtained in situ by using an appropriate precursor capable to be transformed in the desired electron donor compound by means, for example, of known chemical reactions such as esterification, transesterification, etc.

Regardless to the preparation method used, the final amount of the two or more electron donor compounds is such that the molar ratio with respect to the MgCl$_2$ is from 0.01 to 1, preferably from 0.05 to 0.5, while the molar ratio between the 1,3-diether and the aromatic carboxylic acid ester is comprised in the range of from 50 to 0.02 preferably from 30 to 0.1 and more preferably from 20 to 0.2.

As explained above, the pre-polymerized catalyst component can be obtained by pre-polymerizing the solid catalyst component together with an olefin having from 2 to 10 carbon atoms. Said olefin is preferably selected from ethylene propylene, butene-1, hexene, 4-methyl-1-pentene, and octene-1. The use of ethylene is particularly preferred.

The pre-polymerization is normally carried out in the presence of an Al-alkyl compound.

The alkyl-Al compound (B) is preferably chosen among the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as AlEt$_2$Cl and Al$_2$Et$_3$Cl$_3$.

It has been found particularly advantageous to carry out said pre-polymerization using low amounts of alkyl-Al compound. In particular said amount could be such as to have an Al/Ti molar ratio from 0.001 to 50, preferably from 0.01 to 10 and more preferably from 0.05 to 2.5. An external donor selected from silicon compounds, ethers, esters, amines, heterocyclic compounds, ketones and 1,3-diethers of the general formula (I) previously reported can also be employed. However, it has been found advantageous in order to preserve the catalyst activity for longer times, to carry out the prepolymerization without using an external donor.

The pre-polymerization can be carried out in liquid phase, (slurry or solution) or in gas-phase at temperatures generally lower than 50° C., preferably between −20 and 30° C. and more preferably between −10 and 20° C. Furthermore, it is preferably carried out in a liquid diluent in particular selected from liquid hydrocarbons. Among them, pentane, hexane and heptane are preferred.

According to what already described it is apparent that the with term pre-polymerization is meant a polymerization carried out so as to obtain a relatively low yield of polymer with respect to the initial weight of the slid catalyst component. In particular the terms pre-polymerization and pre-polymer can be used according to the present invention when the amount olefin polymer is equal to, or lower than, 50 grams per gram of solid catalyst component. As the average solid catalyst size is generally increased with the pre-polymerization, it must be avoided to use a prepolymerization extent such that the average size of 30 μm is exceeded. The extent of prepolymerization can be easily controlled by monitoring the amount of monomer that is being polymerized. The skilled in the art easily understands that in correspondence with smaller average particle size of the starting solid catalyst component a relatively higher amount of pre-polymer can be produced while respecting the final size limit of 30 μm. Conversely, for starting solid catalyst component with a larger average size a relatively lower amount of prepolymer can be produced. According to the present invention is therefore preferred to prepolymerize the solid catalyst component with the olefin to such an extent that the amount of the olefin prepolymer ranges from 0.1 to 10 grams and more preferably from 0.5 to 5 grams of polymer per gram of said solid catalyst component.

Accordingly, the final average particle size of the prepolymerized catalyst preferably ranges from 15 to 30 μm, preferably from 20 to 30 μm. Such preferred values of extent of prepolymerization and final average size are preferably correlated with the preferred values of average particle size of the starting solid catalyst component previously described.

The prepolymerized solid catalyst components according to the present invention are used in the polymerization of olefins by reacting them with organoaluminum compounds according to known methods.

In particular, it is an object of the present invention a catalyst for the polymerization of olefins CH$_2$=CHR, in which R is hydrogen or a hydrocarbyl radical with 1-12 carbon atoms, comprising the product of the reaction between:

(i) the prepolymerized solid catalyst component as disclosed above and
(ii) an alkylaluminum compound.

The alkyl-Al compound (II) is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides, such as AlEt$_2$Cl and Al$_2$Et$_3$Cl$_3$, possibly in mixture with the above cited trialkylaluminums.

When used in the polymerization of propylene, in order to get high values of isotacticity and xylene insolubility, the catalyst system mentioned above can be used in combination with an external donor (iii).

Suitable external electron-donor compounds include silicon compounds, ethers, esters, amines, heterocyclic compounds and particularly 2,2,6,6-tetramethyl piperidine, ketones and the 1,3-diethers of the general formula (I) previously reported.

The class of preferred external donor compounds is that of silicon compounds of formula R$_a^5$R$_b^6$Si(OR$^7$)$_c$, where a and b are integers from 0 to 2, c is an integer from 1 to 3 and the sum (a+b+c) is 4; R$^5$, R$^6$, and R$^7$, are alkyl, cycloalkyl or aryl radicals with 1-18 carbon atoms optionally containing heteroatoms. Particularly preferred are the silicon compounds in which a is 1, b is 1, c is 2, at least one of R$^5$ and R$^6$ is selected from branched alkyl, cycloalkyl or aryl groups with 3-10 carbon atoms optionally containing heteroatoms and R$^7$ is a C$_1$-C$_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane, (2-ethylpiperidinyl)$_t$-butyldimethoxysilane, (2-ethylpiperidinyl)thexyldimethoxysilane, (3,3,3-trifluoro-n-propyl) (2-ethylpiperidinyl)dimethoxysilane, methyl(3,3,3-trifluoro-n-propyl)dimethoxysilane. Moreover, are also preferred the silicon compounds in which a is 0, c is 3, $R^6$ is a branched alkyl or cycloalkyl group, optionally containing heteroatoms, and $R^7$ is methyl. Examples of such preferred silicon compounds are cyclohexyltrimethoxysilane, t-butyltrimethoxysilane and thexyltrimethoxysilane.

The electron donor compound (iii) is used in such an amount to give a molar ratio between the organoaluminum compound and said electron donor compound (iii) of from 0.1 to 500, preferably from 1 to 300 and more preferably from 3 to 100.

Therefore, it constitutes a further object of the present invention a process for the (co)polymerization of olefins $CH_2=CHR$, in which R is hydrogen or a hydrocarbyl radical with 1-12 carbon atoms, carried out in the presence of a catalyst comprising the product of the reaction between:
(i) the prepolymerized solid catalyst component above described;
(ii) an alkylaluminum compound and,
(iii) optionally an electron-donor compound (external donor).

The polymerization process can be carried out according to known techniques for example slurry polymerization using as diluent an inert hydrocarbon solvent, or bulk polymerization using the liquid monomer (for example propylene) as a reaction medium. However, as mentioned above, it has been found particularly advantageous the use of such catalyst systems in the gas-phase polymerization process where they allow obtaining high yields in conjunction with valuable morphological properties expressed by high values of bulk density.

The process can be carried out operating in one or more fluidized or mechanically agitated bed reactors. Typically, in the fluidized bed reactors the fluidization is obtained by a stream of fluidization gas the velocity of which is not higher than transport velocity. As a consequence the bed of fluidized particles can be found in a more or less confined zone of the reactor.

As explained before, the prepolymerized catalyst of the invention can be used in the fluidized-bed reactors not provided with a prepolymerization section. It allows obtaining polymers, in particular propylene polymers, with bulk densities of about in the range of 0.35-0.42 g/cm³ in conjunction with activities higher than 20 Kg/g of cat.

The polymerization is generally carried out at temperature of from 40 to 120° C., preferably of from 40 to 100° C. and more preferably from 50 to 90° C. The polymerization is carried out in gas-phase the operating pressure is generally between 0.5 and 5 MPa, preferably between 1 and 4 MPa. In the bulk polymerization the operating pressure is generally between 1 and 8 MPa preferably between 1.5 and 5 MPa.

The following examples are given in order to better illustrate the invention without limiting it.

Characterizations

Determination of X.I.

2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference, the X.I. %.

Average Particle Size of the Adduct and Catalysts

Determined by a method based on the principle of the optical diffraction of monochromatic laser light with the "Malvern Master Sizer 2000" apparatus. The average size is given as P50.

Average Particle Size of the Polymers

Determined through the use Tyler Testing Sieve Shaker RX-29 Model B available from Combustion Engineering Endecott provided with a set of six sieves, according to ASTM E-11-87, of number 5, 7, 10, 18, 35, and 200 respectively.

2.6

EXAMPLES

Example 1

Preparation of the Solid Precursor Particles

The solid adduct particles have been prepared according to the procedure described in example 2 of WO05/039745 with the difference that the peripheral velocity of the rotor disk was set at 52.0 m/s. Their average particle size was 16.7 μm while the alcohol content was about 57% wt.

Preparation of Solid Catalyst Component

Into a 60 L stainless steel reactor, purged with nitrogen, 38 L of $TiCl_4$ were introduced and cooled at 0° C. While stirring, 172 g of diisobutylphthalate (DIBP), 111 g of 9,9-bis(methoxymethyl)fluorene (b-MMF) and 2280 g of microspheroidal precursor prepared as above described were introduced. This way, the Mg/DIBP and Mg/b-MMF molar ratio were 15 and 23 respectively. The temperature was raised to 100° C. and maintained for 60 min. Then, the temperature was lowered to 75° C., the stirring was discontinued and the solid product was allowed to settle. After 60 min the supernatant liquid was siphoned off. Then 38 L of fresh $TiCl_4$ were added on the solid product. The mixture was reacted at 110° C. for 30 min and than the reactor cooled to 75° C. and the stirrer discontinued; the solid product was allowed to settle for 30 min and the supernatant liquid was siphoned off. Once again, 38 L of fresh $TiCl_4$ were added on the solid product. The mixture was reacted at 110° C. for 30 min and than the reactor cooled to 75° C. and the stirrer discontinued; the solid product was allowed to settle for 30 min and the supernatant liquid was siphoned off. The solid was washed with 6×38 L of anhydrous hexane six times at 60° C. and one time at room temperature. Finally, the solid was discharged, dried under vacuum, analyzed and tested. It resulted to have an average particle size of 15.6 μm and a SPAN of 1.6. The final composition was, Mg 13.3 wt % Ti 3.1 wt %, DIBP 8.1 wt % and bMMF 3.8 wt %

Preparation of the Pre-Polymerized Catalyst

Into a 60 liters stainless steel reactor, 35 liters of hexane at temperature of 20° C. and, whilst stirring, 1680 g of the spherical catalyst prepared as described above, were introduced. Keeping constant the internal temperature, 84 g of tri-n-octyl aluminum (TNOA) in hexane were (slowly) introduced at room temperature into the reactor. Then ethylene was carefully introduced into the reactor at the same temperature, with a constant flow of 220 g/h. The polymerization was discontinued when a theoretical conversion of 1 g of polymer per g of catalyst was deemed to be reached. After 3 hexane washing at T=20° C. (50 g/l), the resulting pre-polymerized catalyst was dryed and analysed. It contained 1.3 g of polyethylene per g of catalyst and had an average particle size of 27.7 μm.

Gas-Phase Propylene Polymerization
Polymerization Procedure for the Preparation of Propylene Homopolymers Into a gas phase polymerization reactor a polypropylene is produced by feeding separately in a continuous and constant flow the catalyst component in a propane flow, the aluminum triethyl (TEAL), dicyclopentyldimethoxysilane (DCPMS) as external donor, hydrogen (used as molecular weight regulator) and propylene in the gas state in the amounts reported in table 1. The polymerization temperature is 75° C. and the total pressure 24 barg. The polymer particles exiting the reactor are subjected to a steam treatment to remove the reactive monomers and volatile substances, and then dried.

Comparison Example 1

Preparation of the Solid Precursor Particles

The preparation was carried out as described in example 1 with the difference that a lower stirring speed was adopted. As a consequence, the average particle size was 26.1 μm, while the alcohol content was about 57% wt.

Preparation of Solid Catalyst Component

The preparation was carried out as described in example 1. The so obtained solid catalyst resulted to have an average particle size of 26.6 μm The final composition was, Mg 16.5%, Ti 3.4%, DIBP 10.6% and bMMF 4.3%.

Preparation of the Pre-Polymerized Catalyst

The preparation was carried out as described in example 1. The resulting pre-polymerized catalyst that contained 1.15 g of polyethylene per g of catalyst and had an average particle size of 32.1 μm.

TABLE 1

|  |  | Example No. | |
| --- | --- | --- | --- |
|  |  | 1 | Comp. 1 |
| TEAL/DCPMS | Wt ratio | 10 | 9 |
| TEAL/catalyst (neat) | Wt ratio | 10 | 10.5 |
| $H_2/C_3^-$ | Mol. | 0.029 | 0.030 |
| Mileage | Kg/g | 22.7 | 19.4 |
| Xylene insolubles | Wt %/ | 97 | 97.2 |
| Bulk Density | g/cm³ | 0.389 | 0.304 |
| MFR | g/10' | 34.5 | 34.7 |

The invention claimed is:

1. Prepolymerized catalyst component for the polymerization of olefins CH$_2$=CHR wherein R is hydrogen or a hydrocarbyl radical with 1-12 carbon atoms, having an average particle size equal to, or lower than, 30 μm comprising a solid catalyst component which comprises magnesium halide, a titanium compound having at least a Ti-halogen bond and at least two electron donor compounds one of which being selected from 1,3-diethers and the other one being selected from esters of aromatic mono or dicarboxylic acids, said solid catalyst component being prepolymerized with an olefin, having from 2 to 10 carbon atoms, wherein the amount of the olefin polymer so obtained is equal to, or lower than, 50 g per g of solid catalyst component.

2. The prepolymerized catalyst component according to claim 1 wherein the 1,3-diethers are selected from those of formula (I):

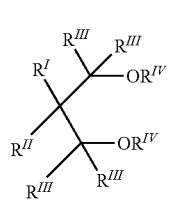

where $R^I$ and $R^{II}$ are the same or different and are hydrogen or linear or branched $C_1$-$C_{18}$ hydrocarbon groups which can also form at least one cyclic structure; $R^{III}$ groups, equal or different from each other, are hydrogen or $C_1$-$C_{18}$ hydrocarbon groups; and $R^{IV}$ groups equal or different from each other, have the same meaning of $R^{III}$ except that they cannot be hydrogen; and wherein each of the $R^I$ to $R^{IV}$ groups can contain heteroatoms selected from halogens, N, O, S and Si.

3. The prepolymerized catalyst component according to claim 2 wherein the 1,3-diethers are selected from the compounds of formula (III):

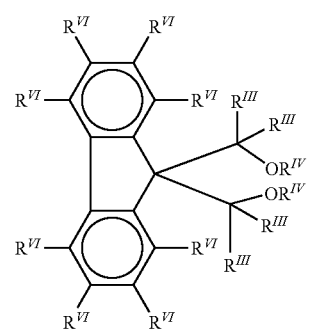

where the $R^{VI}$ radicals equal or different are hydrogen; halogens, $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing at least one heteroatom selected from the group consisting of N, O, S, P, Si and halogens, as substitutes for carbon or hydrogen atoms, or both;
the radicals $R^{III}$ equal or different to each other, are selected from the group consisting of hydrogen; halogens; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals; and
$R^{IV}$ groups equal or different from each other, have the same meaning of $R^{III}$ except that they cannot be hydrogen; and wherein each of the $R^I$ to $R^{IV}$ groups can contain heteroatoms selected from halogens, N, O, S and Si.

4. The prepolymerized catalyst component according to claim 1 wherein the esters of aromatic mono or dicarboxylic acids compound are selected from phthalates.

5. The prepolymerized catalyst component according to claim 4 wherein said esters are $C_1$-$C_6$ linear or branched alkyl esters of phthalic acids.

6. The prepolymerized catalyst component according to claim 1 wherein a molar ratio between the 1,3-diether and the ester donor is in the range of from 0.02 to 50.

7. A catalyst for the polymerization of olefins CH$_2$=CHR, wherein R is hydrogen or a hydrocarbyl radical with 1-12 carbon atoms, comprising the product of the reaction between:

(i) a prepolymerized solid catalyst component having an average particle size equal to, or lower than, 30 μm comprising a solid catalyst component which comprises magnesium halide, a titanium compound having at least a Ti-halogen bond and at least two electron donor compounds one of which being selected from 1,3-diethers and the other one being selected from esters of aromatic mono or dicarboxylic acids, said solid catalyst component being prepolymerized with an olefin, having from 2 to 10 carbon atoms, wherein the amount of the olefin polymer so obtained is equal to, or lower than, 50 g per g of solid catalyst component; and (ii) an alkylaluminum compound.

8. The catalyst according to claim 7 further comprising an external electron donor compound.

9. The catalyst according to claim 8 wherein the electron donor compound is selected from silicon compounds of formula $R_a^5R_b^6Si(OR^7)_c$, where a and b are integer from 0 to 2, c is an integer from 1 to 4 and the sum (a+b+c) is 4; $R^5$, $R^6$ and $R^7$ are alkyl, cycloalkyl or aryl radicals with 1-18 carbon atoms, optionally containing heteroatoms.

10. The catalyst according to claim 9 wherein a is 1, b is 1 and c is 2.

11. A gas phase process for the (co)polymerization of olefins $CH_2$=CHR, wherein R is hydrogen or a hydrocarbyl radical with 1-12 carbon atoms, carried out in the presence of a catalyst comprising the product of the reaction between:

(i) a prepolymerized solid catalyst component having an average particle size equal to, or lower than, 30 μm comprising a solid catalyst component which comprises magnesium halide, a titanium compound having at least a Ti-halogen bond and at least two electron donor compounds one of which being selected from 1,3-diethers and the other one being selected from esters of aromatic mono or dicarboxylic acids, said solid catalyst component being prepolymerized with an olefin, having from 2 to 10 carbon atoms, wherein the amount of the olefin polymer so obtained is equal to, or lower than, 50 g per g of solid catalyst component;

(ii) an alkylaluminum compound; and (iii) optionally an external donor compound.

12. The prepolymerized catalyst component of claim 3 where the $R^{VI}$ radicals equal or different are Cl or F.

13. The prepolymerized catalyst component of claim 3 where the at least one heteroatom is Cl or F, as substitutes for carbon or hydrogen.

\* \* \* \* \*

UNITED STATES PATENT AND TRADEMARK OFFICE
CERTIFICATE OF CORRECTION

PATENT NO. : 9,453,088 B2
APPLICATION NO. : 12/735278
DATED : September 27, 2016
INVENTOR(S) : Gianni Collina et al.

It is certified that error appears in the above-identified patent and that said Letters Patent is hereby corrected as shown below:

On the Title Page

Item (30)     Delete "07150461" and insert --07150461.7--

In the Specification

| | | |
|---|---|---|
| Column 2 | Line 40 | After "(I)", insert --:-- |
| Column 3 | Line 15 | Delete "2 (p-fluorophenyl)-1,3-dimethoxypropane, 2 (1-decahydronaphthyl)-1,3-dimethoxypropane," and insert --2(p-fluorophenyl)-1,3-dimethoxypropane, 2(1-decahydronaphthyl)-1,3-dimethoxypropane,-- |
| Column 3 | Line 30 | Delete "2,2-bis(2-cyclohexylethyl)-1,3-dim ethoxypropane," and insert --2,2-bis(2-cyclohexylethyl)-1,3-dimethoxypropane,-- |
| Column 3 | Line 39 | Delete "2,2-di isobutyl-1,3-diethoxypropane," and insert --2,2-diisobutyl-1,3-diethoxypropane,-- |
| Column 3 | Line 45 | Delete "2-cyclohexyl-2-cyclo hexylmethyl-1,3-dimethoxypropane." and insert --2-cyclohexyl-2-cyclohexylmethyl-1,3-dimethoxypropane.-- |
| Column 3 | Line 48 | After "(II)", insert --:-- |
| Column 5 | Line 31 | Delete "di-1-pentyl" and insert --di-i-pentyl-- |
| Column 6 | Line 4 | Delete "(100-130° C)." and insert --(100 °C.-130 °C.).-- |
| Column 6 | Line 9 | Delete "($R_{EM}$)" and insert --($Re_M$)-- |
| Column 6 | Line 63 | Delete "(80-130° C.)" and insert --(80 °C.-130 °C.)-- |
| Column 7 | Line 1 | Delete "80-130° C." and insert --80 °C.-130 °C.-- |
| Column 7 | Line 55 | Delete "-20 and 30° C." and insert -- -20 °C. and 30 °C.-- |
| Column 7 | Line 56 | Delete "-10 and 20° C." and insert -- -10 °C. and 20 °C.-- |
| Column 8 | Line 37 | Delete "(II)" and insert --(ii)-- |
| Column 8 | Line 67 | Delete "(2-ethylpiperidinyl)$_t$-butyldimethoxysilane," and insert --(2-ethylpiperidinyl)t-butyldimethoxysilane,-- |
| Column 9 | Line 50 | Delete "40 to 120° C.," and insert --40 °C. to 120 °C.,-- |

Signed and Sealed this
Fifth Day of February, 2019

Andrei Iancu
*Director of the United States Patent and Trademark Office*

CERTIFICATE OF CORRECTION (continued)
U.S. Pat. No. 9,453,088 B2

| Column 9 | Line 50 | Delete "40 to 100° C." and insert --40 °C. to 100 °C.-- |
| Column 9 | Line 51 | Delete "50 to 90° C." and insert --50 °C. to 90 °C.-- |
| Column 10 | Line 28 | Delete "TiCl$_a$" and insert --TiCl$_4$-- |
| Column 10 | Line 52 | After "3.8 wt %", insert --.-- |
| Column 10 | Line 65 | Delete "dryed" and insert --dried-- |
| Column 11 | Line 11 | After "barg.", insert --¶-- |

In the Claims

| Column 12 | Line 12 | In Claim 2, after "structure;", insert --¶-- |
| Column 12 | Line 14 | In Claim 2, after "and", insert --¶-- |
| Column 12 | Line 17 | In Claim 2, after "and", insert --¶-- |
| Column 13 | Line 20 | In Claim 9, after "4;", insert --¶-- |